J. W. LAMBERT.
TRACTION WHEEL CLEAT.
APPLICATION FILED DEC. 13, 1912.

1,120,946.

Patented Dec. 15, 1914.

2 SHEETS—SHEET 1.

WITNESSES:
A. H. Edgerton
O. M. McLaughlin

INVENTOR.
John W. Lambert.
BY
V. H. Lockwood
ATTORNEY.

UNITED STATES PATENT OFFICE.

JOHN W. LAMBERT, OF ANDERSON, INDIANA.

TRACTION-WHEEL CLEAT.

1,120,946.   Specification of Letters Patent.   Patented Dec. 15, 1914.

Application filed December 13, 1912. Serial No. 736,493.

*To all whom it may concern:*

Be it known that I, JOHN W. LAMBERT, a citizen of the United States, and a resident of Anderson, county of Madison, and State of Indiana, have invented a certain new and useful Traction-Wheel Cleat; and I do hereby declare that the following is a full, clear, and exact description thereof, reference being had to the accompanying drawings, in which like letters refer to like parts.

The object of this invention is to provide an improved construction of cleats, and means for controlling and operating the cleats on a traction wheel or the like.

The chief feature of the invention consists in providing a number of cleats pivotally mounted on the tire rim of the wheel, and means for simultaneously oscillating all of said cleats from an idle position to position for engaging the surface of the ground or street.

This invention is rendered important because traction engines or drive wheels of automobiles skid or slip on wet pavements and roadways and where the devices are heavy especially it is necessary to provide means readily adjustable for throwing cleats into position to engage the surface of the roadway or street and prevent slipping. Hence, wheels provided with the cleat construction herein shown are capable of operation on a wet pavement or a roadway with a very wet surface, or in soft ground, and the whole body of the cleats at the lower part of the wheel bear upon the surface of the ground so as to materially increase the tread portion of the wheel.

Figure 1:
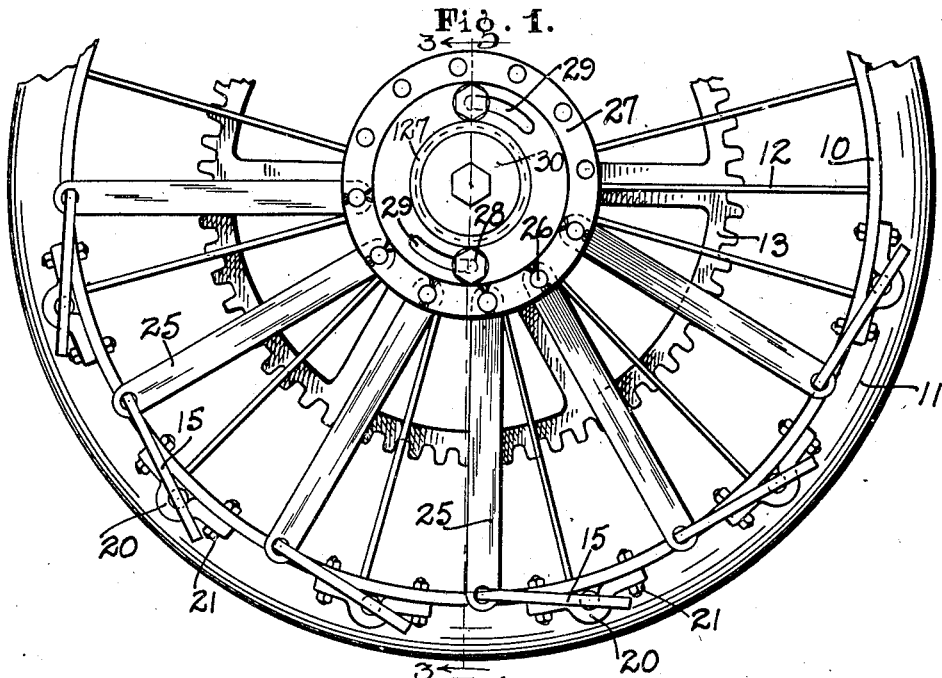
Figure 2:
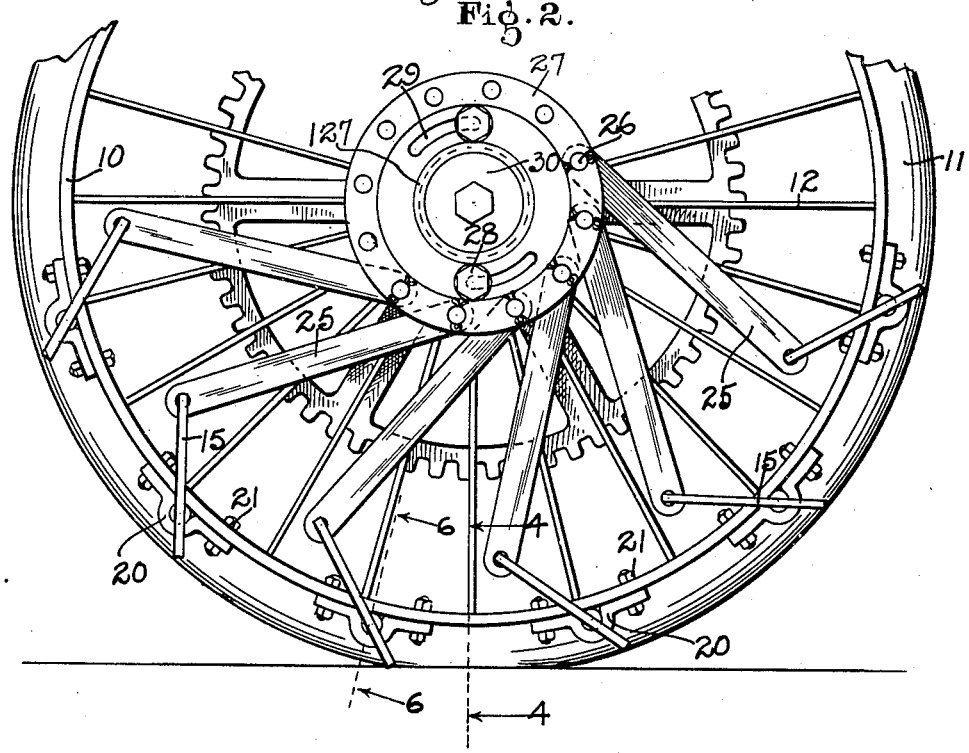
Figure 3:
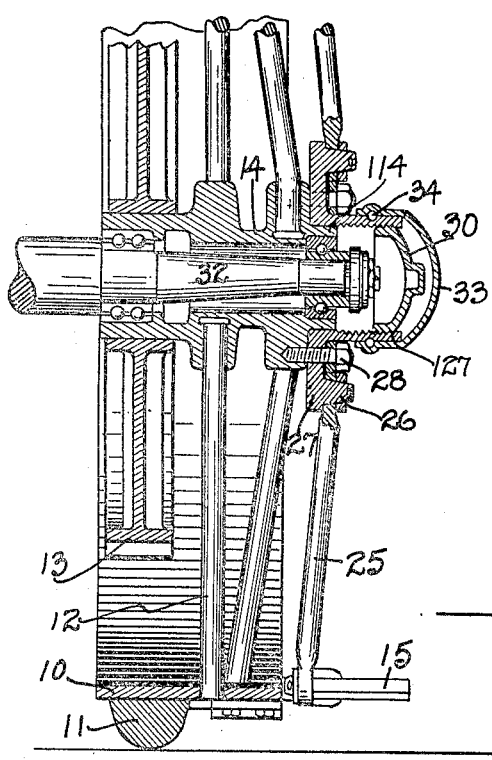
Figure 4:
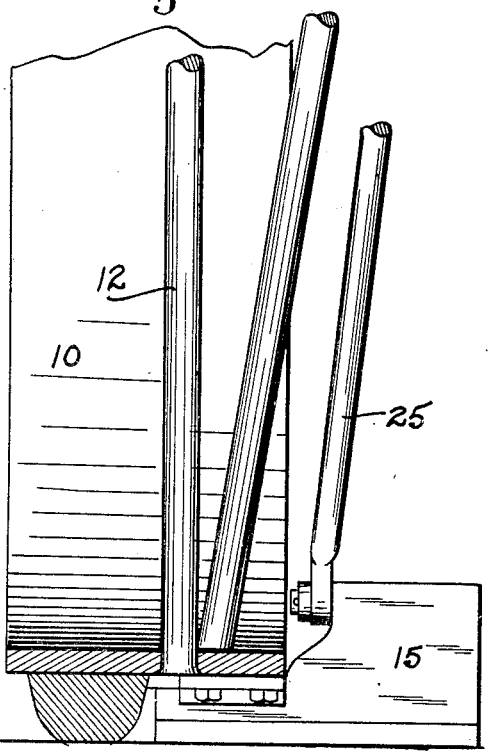
Figure 5:
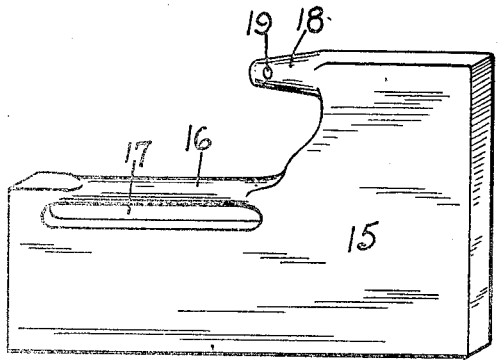
Figure 6:
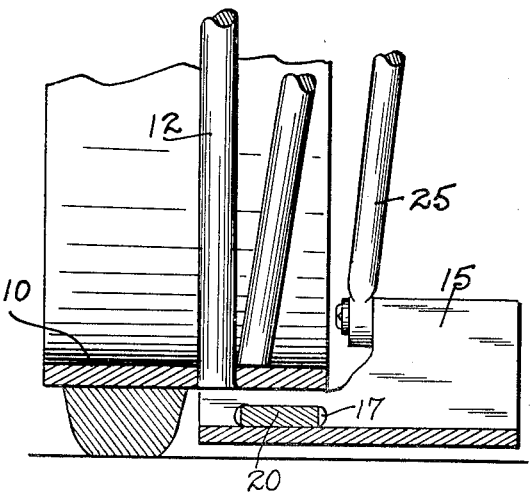

The nature of the invention will be understood from the accompanying drawings and the following description and claims:

In the drawings, Figure 1 is a side elevation of the lower half of a traction wheel with the cleats in idle position, the upper part of the wheel being broken away. Fig. 2 is the same with the cleats in operative or engaging position. Fig. 3 is a central vertical section on the line 3—3 of Fig. 1. Fig. 4 is the lower part of Fig. 3 enlarged with a cleat thrown down into engaging position, being a section on the line 4—4 of Fig. 2. Fig. 5 is a plan view of the cleat. Fig. 6 is a section on the line 6—6 of Fig. 3.

The drawings herein, for showing the general nature of this invention, disclose a traction wheel of ordinary type having a tire rim 10 surrounded by a solid rubber tire 11, spokes 12, gear 13 to which power is transmitted for propelling the wheel, and a hub 14, see Fig. 3.

The tire rim is much wider than the tire so that the tire 11 is placed on the left-hand side of the spokes, see Fig. 3, and thus space is left to the right-hand side of the tire 11 for the mounting of the cleats. The cleats are plates formed as shown in Fig. 5, having a length adapted to extend from the rubber tire 11 to the right laterally beyond the wheel, as shown in Figs. 3 and 4. The cleat has a narrow inner end and a wide outer end, the portion projecting laterally beyond the tire rim of the wheel being nearly twice as wide as the inner portion, as shown in Fig. 5. The inner portion of the cleat has a rod-like bearing 16 formed integral with the plate and extending longitudinally of the plate for about half of its length and a slot 17 lies parallel with said bearing rod 16 so as to separate the latter. The cleat is secured to the tire rim of the wheel by a metal plate 20, as shown in Figs. 1 and 2, and said plates 20 are secured to the tire rim of the wheel by bolts 21. The width of each plate 20 is slightly less than the length of the slot 17 in the cleat so that the plate can be inserted through said slot. Likewise the plate 20 has a semi-circular outward bend midway thereof to leave a transverse recess for the bearing rod 16 of the cleat. In assembling the parts, a plate 20 is inserted into the slot 17 of the cleat about half way and then the bearing rod 16 of the cleat will lie in the recess midway of the plate 20. Then the plate 20 is bolted to the tire rim of the wheel so that the wide portion of the cleat will extend laterally beyond the wheel, as shown.

The mounting of the cleats heretofore described enables them to be oscillated to the positions shown in Figs. 1 and 2, and this oscillation is accomplished by bars 25 extending radially of the wheel, as shown in Fig. 1, and at their outer ends pivoted to a projection 18 of the cleat, as shown in Fig. 5. This projection is integral with the cleat and extends parallel with the bearing rod 16, but it does not appreciably overlap it and it has a hole 19 through it for a cotter pin. There is one bar 25 for each cleat and at their inner ends said bars are pivoted by pins 26 to a circular plate 27 which surrounds the outer portion of the hub 14, and has a radial portion secured to the hub by set screws 28 which project through slots 29 in a plate concentric with the center of the plate, as shown in Figs. 1 and 2. As seen in Fig. 3, the plate 27 has also a cylindrical portion 127 which fits on the cylindrical extension 114 from the hub 14, and the internal surface of portion 127 of the plate 27 is threaded to receive a screw cap 30 which closes the outer end of the hub to form a grease chamber and force the grease into the bearings of the axle 32 having the nut 31. A thin outer cap 33 springs over a rib 34 on the outer surface of the cylindrical surface of the portion 127 of the plate 27 so as to entirely protect the structure from dirt.

Since the plate 27 with which the bars 25 are pivotally connected is angularly adjustable, it is seen that the position of all of the cleats can be simultaneously adjusted by adjustment of the plate 27. Thus in Fig. 1, the parts are adjusted so that the cleats will be in idle position, almost parallel with the tire rim of the wheel. By loosening the screws 28 and turning the plate 27 to the position shown in Fig. 2, and then tightening said screws, the bars 26 will draw the inner ends of the cleats inward so that the outer ends will project farther outward and engage the surface of the street, particularly under load, as shown in Fig. 4, and thus prevent the wheel from slipping. The extent of this outward adjustment of the cleats is in the control of the operator and varies according to the thickness of the rubber tire and the purposes for which the adjustment is desired. Thus, when a traction engine comes upon a wet asphalt pavement, the cleats can be thrown into engaging position, and when the pavement or roadway is not wet, the cleats can all be adjusted back to their idle position. In that way the "traction" of the car can be regulated to meet the demands of the roadway and the load. In soft ground the cleats, when in the position shown in Fig. 2, are arranged so that their flat wide surfaces will bear upon the ground at an inclination with the surface thereof and prevent the wheel from racing.

I claim as my invention:

1. A traction wheel for vehicles including a tire rim, a yielding tire surrounding said tire rim, cleats formed of plates having longitudinal slots through one end thereof so as to leave a bearing portion, plates extending through the slots in said cleats and secured upon the periphery of the tire rim beside the tire so that the cleats will extend laterally from the tire and beyond the rim, and means for oscillating said cleats.

2. A traction wheel for vehicles including a tire rim, a cleat formed of a plate, one end of which is wider than the other end and the narrow end is provided with a longitudinal slot about midway of said end to form a bearing rod, a plate insertible through the slot of said cleat and having a bend therein for partially enveloping said rod on the cleat, means for securing said plate to the tire rim so that the cleat may be oscillated and the wide portion thereof will project laterally beyond the wheel rim, and means pivoted with the wide portion of the cleat for oscillating and adjusting it.

3. A traction wheel for vehicles including a tire rim, a cleat formed of a plate, one end of which is wider than the other end and the narrow end is provided with a longitudinal slot about midway of said end to form a bearing rod and a projection from the wide end of said cleat parallel with the bearing rod thereof, a plate insertible through the slot of said cleat and having a bend therein for partially enveloping said rod on the cleat, means for securing said plate to the tire rim so that the cleat may be oscillated and the wide portion thereof will project laterally beyond the wheel rim, a connecting bar pivotally connected with the pin on the wide end of said cleat, and angularly adjustable means mounted in connection with the side of the wheel with which said bars are connected, whereby the said cleats may be adjusted simultaneously.

In witness whereof, I have hereunto affixed my signature in the presence of the witnesses herein named.

JOHN W. LAMBERT.

Witnesses:
 RAYMOND H. ROSE,
 GRACE CASTETTER.